United States Patent [19]

Pollack

[11] Patent Number: 5,153,580

[45] Date of Patent: Oct. 6, 1992

[54] RETRIGGERABLE SLEEP TIMER WITH USER-PROMPTING MODE OPERATION

[75] Inventor: Jeremy D. Pollack, Kingston, N.J.

[73] Assignee: RCA Thomson Licensing Corporation, Princeton, N.J.

[21] Appl. No.: 465,833

[22] Filed: Jan. 16, 1990

[51] Int. Cl.⁵ .............................................. H04N 5/44
[52] U.S. Cl. ........................... 340/825.25; 340/309.15; 340/825.69; 455/231; 358/194.1; 359/142
[58] Field of Search ...................... 340/825.69, 825.72, 340/825.25, 309.15, 309.4, 326, 328, 329; 341/176; 358/194.1, 188, 22; 455/600, 603, 231, 352, 353, 355; 359/142, 148

[56] References Cited

U.S. PATENT DOCUMENTS

| | | | |
|---|---|---|---|
| 4,331,977 | 5/1982 | Cohn et al. | 455/231 |
| 4,481,674 | 11/1984 | Silva | 455/231 |
| 4,626,892 | 12/1986 | Nortrup et al. | 358/188 |
| 4,703,359 | 10/1987 | Rumbolt et al. | 340/825.69 |
| 4,821,102 | 4/1989 | Ichikawa et al. | 358/22 |

FOREIGN PATENT DOCUMENTS

| | | | |
|---|---|---|---|
| 0205830 | 11/1984 | Japan | 455/231 |
| 60-87532 | 5/1985 | Japan . | |
| 63-75592 | 4/1988 | Japan . | |

OTHER PUBLICATIONS

Patent Abstract of Japan, vol. 5, No. 81, May 27, 1981, p. 63, JP-A-56 029 765, Electronic Desk Computer.
WO 82/03520 Appliance Non-Use Detection Safety Shut-Off System, Abstract.
Patent Abstract of Japan, vol. 9, No. 69, Mar. 29, 1985, JP-A-59 205 830, Radio Receiver with Alarming Function.
Patent Abstract of Japan, vol. 4, No. 146, Oct. 15, 1980, JP-A-55 95 896, Working Time Setting Device.
Patent Abstract of Japan, vol. 3, No. 89, Jul. 28, 1979, JP-A-54 67 464, Electronic Digital Watch.
Patent Abstract of Japan, vol. 7, No. 27, Feb. 3, 1983, JP-A-57 181 281, Television Receiver.
RCA CTC-140 Color TV Chassis Technical Training Manual, p. 21, 1987.
Owner's Manual for the RCA Color Television Model F27195CP, p. 24, 1989.
A Portion of the 1989 Supplemental Guide to Goldstar Products.

*Primary Examiner*—Donald J. Yusko
*Assistant Examiner*—Peter S. Weissman
*Attorney, Agent, or Firm*—Joseph S. Tripoli; Peter M. Emanuel; Thomas F. Lenihan

[57] ABSTRACT

A sleep timer function for consumer electronics equipment automatically turns off the equipment after a predetermined time interval. During the final two minutes of the sleep time interval, the sleep timer circuitry gradually decreases the volume or provides a visual indication that automatic turn off is imminent. The reception of any modulated infrared (IR) signal, transmitted from any source, during the timer period is interpreted by the sleep timer function controller as an indication that the use is still awake. In response, the controller resets the count of the sleep timer to the maximum period, thus deferring the automatic turn off of the equipment.

16 Claims, 6 Drawing Sheets

RETRIGGERABLE SLEEP TIMER WITH USER-PROMPTING MODE OPERATION

This invention concerns consumer electronic equipment having an automatic sleep timer function.

BACKGROUND OF THE INVENTION

The term consumer electronic equipment, as used herein, includes television receivers, videodisc players, video tape players (VTPs), compact disc players (CDs), and radios. The term television receiver, as used herein, includes television receivers having a display device (commonly known as television sets) and television receivers without a display device such as VCRs.

Many modern television receivers include a so-called sleep timer function for automatically turning the receiver off after a predetermined time interval set by a user. The sleep timer function allows a user to conserve power by shutting off the television receiver automatically if the user has fallen asleep. Such a sleep function is known from, for example, RCA CTC-140 type television receivers manufactured by Thomson Consumer Electronics Incorporated, Indianapolis, Ind.

Unfortunately, even though a user has set a predetermined time for the television to automatically turn off the user may not fall asleep, but rather may become interested in the program and remain awake. In this case, the user may forget that the sleep timer is enabled, and then find to his surprise that the television automatically turns itself off.

A related common problem, which occurs especially in households with small children, is the problem of wasted power due to unattended operation of a television receiver (or other consumer electronics equipment). That is, it frequently happens that children will turn on a television receiver, become distracted, and leave the room to play elsewhere. In this situation, conventional sleep timer capability in the television receiver would not solve the problem. This is so, because conventional sleep timers must be enabled in some fashion to become active and begin timing the timeout period. Since children, it seems, cannot be expected to turn off the receiver, they certainly cannot be expected to perform the more complex task of enabling a sleep timer function.

SUMMARY OF THE INVENTION

The subject invention resides in part in the recognition that it is desirable that a sleep timer function be reset and restarted in response to an indication that the user is still awake. It is herein recognized that operation of a remote control by a user, for any reason, provides a clear indication to the sleep function controller that the user is still awake. Consequently, apparatus in accordance with the invention resets the time delay period of the sleep timer and restarts the timer, whenever it receives a transmission from a remote control transmitter unit.

It is also herein recognized that operation of any remote control transmitter unit for controlling any device, such as a VCR associated with the television receiver, provides a detectable indication that the user is awake. For this reason, reception of modulated infrared (IR) signals from any remote control unit will be accepted by the subject apparatus for the purpose of resetting the sleep timer.

It is further herein recognized that it is desirable that the television receiver provide an audible, or visual, indication that it is about to automatically turn off.

It is also herein recognized that the volume can be automatically reduced to a level near zero before turning off the receiver. It is also herein recognized that such volume reduction should not affect the volume level to be restored when the receiver is next turned on.

Additionally, it is herein recognized that a sleep timer feature should not have to be deliberately enabled by a user. Accordingly, in one embodiment the timer is enabled automatically when the receiver is turned on. In another embodiment the sleep timer is enabled only during a preset time portion of the day. In one embodiment, the sleep time interval is fixed. In another embodiment, the sleep time interval is user presettable.

DETAILED DESCRIPTION OF THE DRAWING

Figure 1:
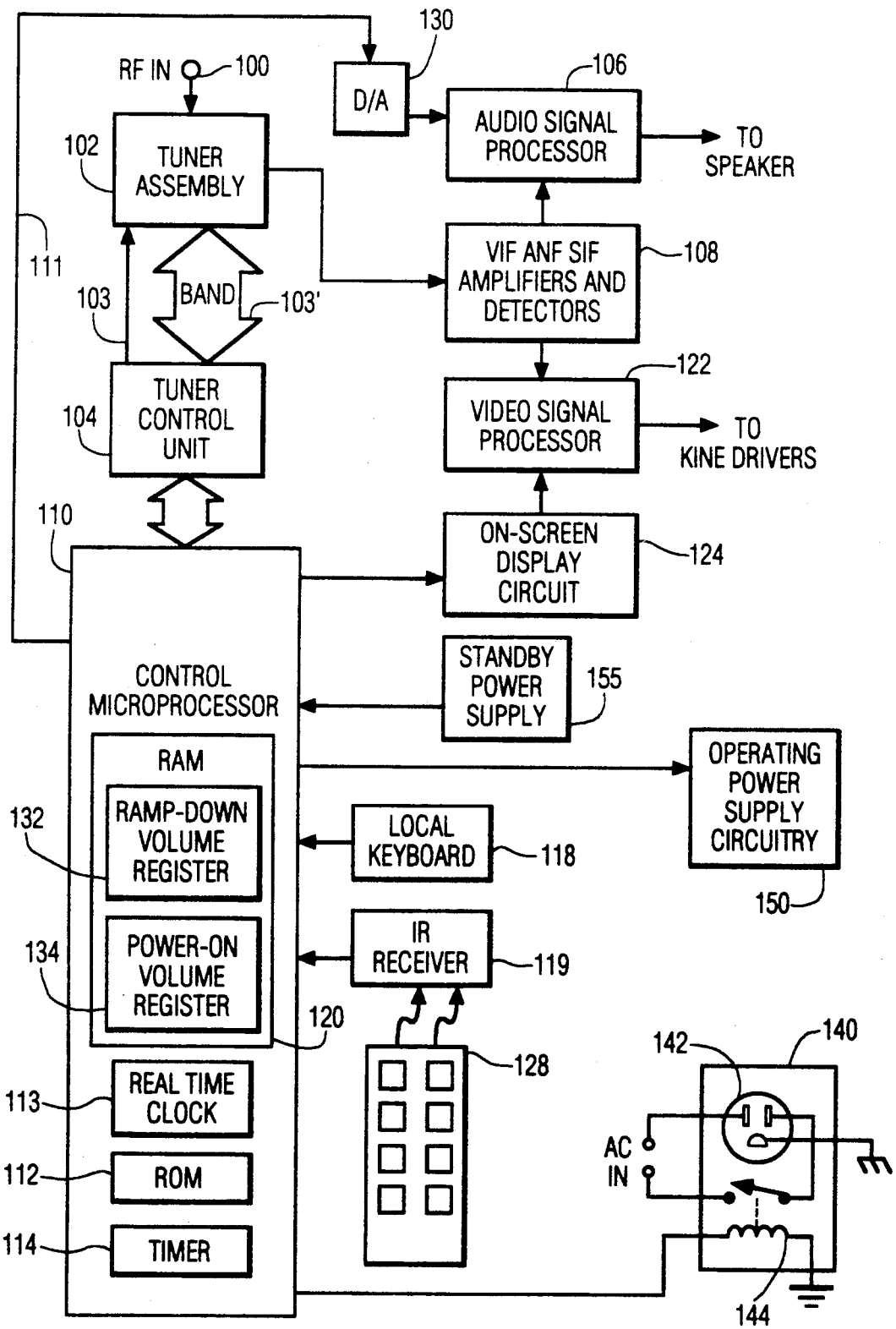
FIG. 1 is a block diagram of a portion of a television receiver suitable for implementing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 108. VIF/SIF amplifier and detector unit 108 amplifies the IF signal applied to its input terminal and detects the video and audio information contained therein. The detected video information is applied as one input of a video processor unit 122. The other input of video processor unit 122 is connected to an on-screen display circuit 124. The detected audio signal is applied to an audio processor 106 for processing and amplification before being applied to a speaker (not shown).

Tuner controller 104 generates the tuning voltage and bandswitching signals in response to control signals applied from a system control microcomputer ($\mu$C) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 119 and from a "local" keyboard 118 mounted on the television receiver itself. IR receiver 119 receives IR transmissions from remote control transmitter 126. Microcomputer 110 includes program memory (ROM) 112, and stores channelrelated data in a random-access memory (RAM) 120. RAM 120 may be either internal to, or external to, microprocessor 110, and may be of either the volatile or non-volatile type. The term "RAM" is also intended to include electrically-erasable programmable read only memory (EEPROM). One skilled in the art will recognize that if volatile memory is utilized, that it may be desirable to use a suitable form of standby power to preserve its contents when the receiver is turned off.

Microcomputer 110 operates from a source of standby power 155, and controls a source of operating power 150 for selectively applying power to the remainder of the television receiver. Microcomputer 110 includes a real time clock 113 for keeping time of day. Microcomputer 110 also includes a timer 114 the operation of which will be described below. Microcomputer 110 is also coupled, via a wire 111 to a digital-to-analog (D/A) converter unit 130. Under microprocessor control, D/A unit 130 generates a control signal for controlling the level of volume produced by audio processor 106 and its associated speaker.

The television receiver described thusfar is known, for example, from the RCA CTC-140 color television manufactured by Thomson Consumer Electronics, Inc., Indianapolis, Ind.

The invention will now be described with reference to the remainder of FIG. 1, and the flow chart of FIG. 2.

Preferably, TIMER 114 of FIG. 1 times a fixed predetermined time interval which may be, for example, 30 minutes. Alternatively, a user may enter a predetermined time interval of his own choosing. Because ease of use is an important concern, it is desirable that the enabling of TIMER 114 should require no separate action by the user. Therefore, in one embodiment, TIMER 114 is enabled automatically when the television receiver is turned on. It is recognized that, in some instances, it may be undesirable to have the sleep timer always enabled. For those instances, remote control unit 126 may include a SLEEP TIMER ON/OFF key. The first operation of the SLEEP TIMER ON/OFF key disables the sleep timer function until the next operation of the SLEEP TIMER key, which reenables the sleep timer function. In another embodiment, the sleep timer function may be enabled, in accordance with signals from a real time clock 113, only during a predetermined portion of the day. For example, the sleep timer might only be enabled from 11:00 pm until 6:00 am, when the user would be most apt to fall asleep with the television receiver still turned on. If, however, the sleep timer is enabled at all times, then it may not be necessary to include real time clock 113 for the sleep timer function.

Assuming that the timer is enabled, if no modulated IR signals are detected during the 30 minute sleep time interval, the receiver is turned off. If modulated IR signals are detected during the 30 minute interval, then TIMER 114 is reset, and begins timing a new 30 minute interval. This process may be repeated several times. The flowcharts of FIGS. 2 and 3 describe in different levels of detail a program for accomplishing this function, as well as other functions described below.

Figure 2:
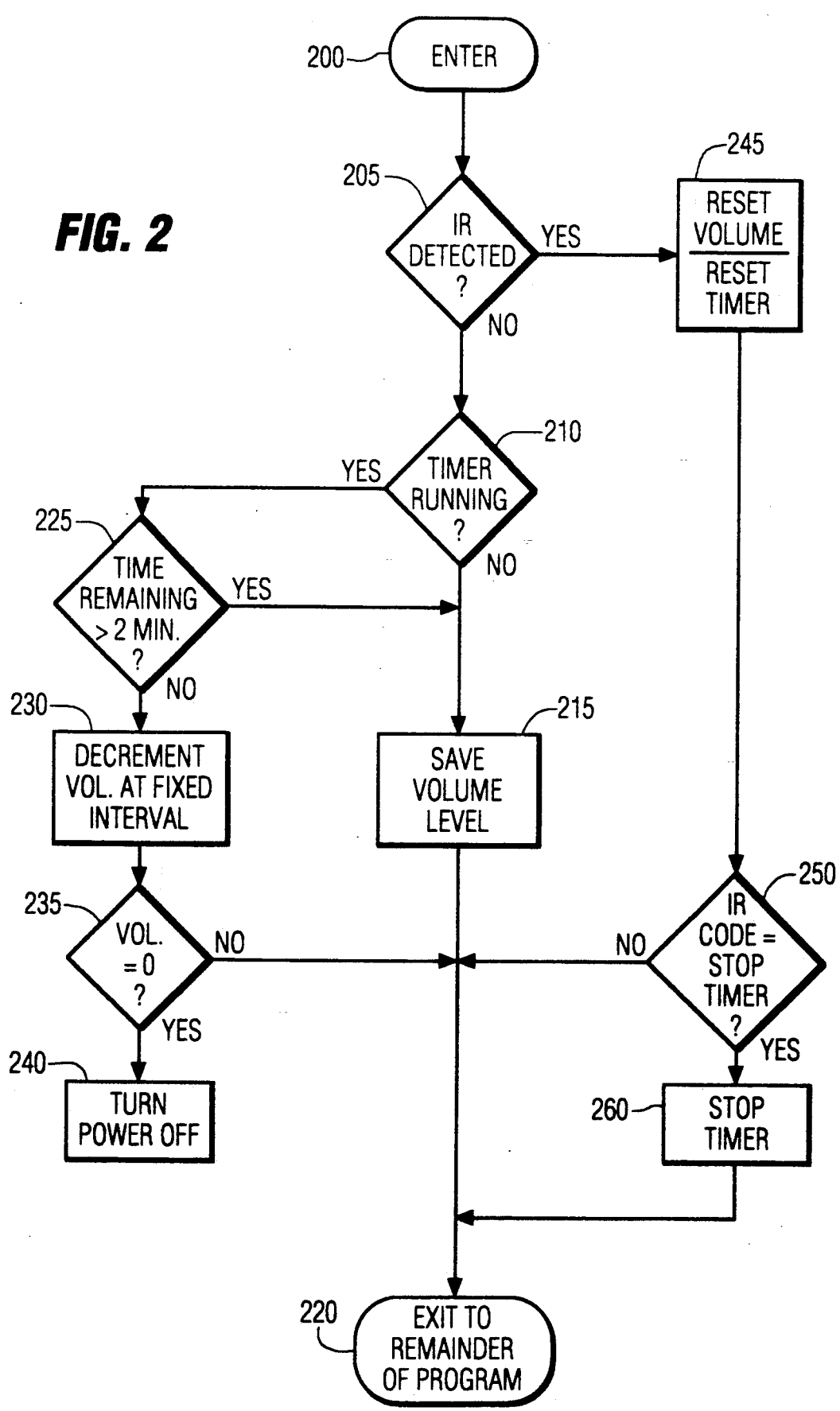
FIG. 2 is a simplified flow chart of a portion of the control program suitable for controlling the microprocessor of FIG. 1.

The portion of the control program illustrated in FIG. 2 is entered at step 200 from other portions of the control program, such as tuner control and keyboard decoding, which are not pertinent to the subject invention, and therefore need not be explained in detail.

A determination is made at step 205 as to whether or not a modulated infrared (IR) signal has been detected. The IR detector normally used for the reception of IR remote control signals is also used for this purpose as follows.

If the remote control signals are encoded utilizing some form of pulse code, the IR detector will include a bandpass filter centered at the IR frequency of interest followed by an envelope detector, such as an integrator, for producing an electrical pulse signal corresponding to the modulation of the received IR signal. To decode a remote control command, microprocessor 110 samples the pulse signal to detect the "high" and "low" portions. For the purpose of step 205, it is not necessary to fully decode the pulse signal, and it is sufficient to determine the presence of a sequence of "highs" and "lows".

If the remote control signals are encoded utilizing frequency modulation, the IR detector will include a bandpass filter centered at the IR frequency range of interest followed by a transition detector, such as a differentiator, for producing a an electrical signal having transitions at the same frequency as the received IR signal. To decode a remote control signal, microprocessor 110 determines the time interval between the transitions to determine the frequency of IR signal. As in the case of a pulse encoded IR signal, for the purpose of step 205, it is not necessary to decode the remote control signal. In this case it is sufficient to determine if the bandpass filter produces an output signal of the proper level.

For the reasons to be explained below, it is desirable that TIMER 114 be reset in response to the presence of modulated IR from remote control transmitters for controlling other devices associated with the television receiver. Since different types of IR modulation may be used, it may be desirable to make provisions for detecting both the pulse and the frequency types of IR modulation. If an IR signal has not been detected, the program advances to step 210 wherein a check is made to see if TIMER 114 is running. If not, the current volume level selected by the user is stored (step 215) in a power-on volume register 134, and the routine is exited at step 220. Power-on volume register 134 holds the volume setting at which the receiver was operating just before it was last manually turned-off by the user. Register 134 is read at power-on so that the last volume setting can be restored automatically.

Referring again to the FIGURES, if it is determined at step 210 that TIMER 114 is running then a check is made to see if the time interval is near expiration (i.e., two minutes or less remaining of the 30 minute sleep time interval)(step 225). If not, the current volume level is stored in power-on volume register 134 to make sure that the volume level data is up-to-date and accurate, and the routine exited. Each time the controller "loops through" this portion of the control program, the controller checks the time remaining in the sleep time interval. If the time remaining in the sleep time interval is two minutes or less (step 225), then controller 110 begins to decrement the volume setting stored in rampdown volume register 132 at a fixed interval (perhaps once every second), which causes the volume to slowly "ramp" down. This is done to prevent a sleeping, or near sleeping, user from being awakened by a sudden cessation of sound when the television receiver is turned off. At step 235, the volume level stored in rampdown volume register 132 is checked to see if it has been reduced to zero. If not, the routine is exited. If so, the power to the television receiver is turned off (step 240).

If IR is detected at step 205, then the volume is reset to the last level set by the user, that is, the value stored in power-on register 134 is read and stored in ramp-down register 132. TIMER 114 is then reset, and begins timing the interval again.

During the final two minutes of the sleep timer interval, a ramping down (i.e. gradual reduction) of the volume, or a visual indication on the display screen of the receiver, is provided to cause a user who is still awake to activate the remote control, while not disturbing a user who has fallen asleep. It is noted that when the volume ramps down, the normal reaction of a user would be to pick up the remote control and to attempt to restore the proper volume. The act of utilizing the remote control, or the local keyboard, is interpreted by the apparatus of the subject invention as an indication that the user is still awake, and causes the sleep timer to be reset and restarted.

Note that the IR command does not have to be decoded at this stage because reception of any modulated IR signal (decodable in the television receiver or not) is taken to mean that the user is still awake, and does not want his viewing of the television program disturbed. At step 250, an attempt is made to decode the modulated IR signal. If it is the STOP TIMER code, then TIMER 114 is stopped (step 260). If not, further decoding is performed in a keycode decoding routine, which is known, per se.

In order to make the above-described operation clear, note that with a system comprising a VCR from one manufacturer and a television receiver from another manufacturer, it is unlikely that the control codes for the two devices will be compatible. It is herein recognized that for purposes of resetting the sleep function timer, the specific content of the transmission from a particular remote control hand unit is unimportant. What is important, is the fact that a transmission was sent, because the fact of a transmission indicates that the user is still awake. Consequently, reception of any modulated IR signal is an indication that the television receiver should not be turned-off.

Further to this point, some known cable decoder units provide volume control via IR remote control signals. If a television receiver incorporating the subject invention were to be coupled to such a cable decoder unit, the following operation would occur. During the final two minutes of the sleep time interval, the television receiver would begin to gradually reduce the audio volume and the user would naturally pick up the remote control for the cable decoder unit to correct for the reduced volume. Due to different encoding and modulation schemes employed by individual manufacturers, the user's television receiver would most likely be unable to decode the remote control message transmitted by his cable decoder remote control unit. Nevertheless, the sleep timer controller of the television receiver would recognize that a modulated IR signal was transmitted, and would in response thereto, reset the volume level and the reset the sleep timer.

It is envisioned that the subject apparatus may be included in television sets, VCR's and other signal sources such as video tape players, or videodisc players. If so, then a user may watch a program from one of these sources and have each element of his system shut down individually, if he falls asleep. It is also envisioned, as shown in FIG. 1, that a television receiver may be equipped with a controlled power outlet 140 for providing AC power via a receptacle 142 to other system components. If such a receiver were also equipped with the above-described sleep function circuitry, then the automatic turn-off feature would be made available to any apparatus plugged into the controlled outlet, which would cause the turning off of both units simultaneously. Controlled outlet 140 is illustrated for purposes of simplicity as incorporating an electromechanical relay 144. It may, of course, be controlled via solid-state switching circuitry instead.

Figure 3:
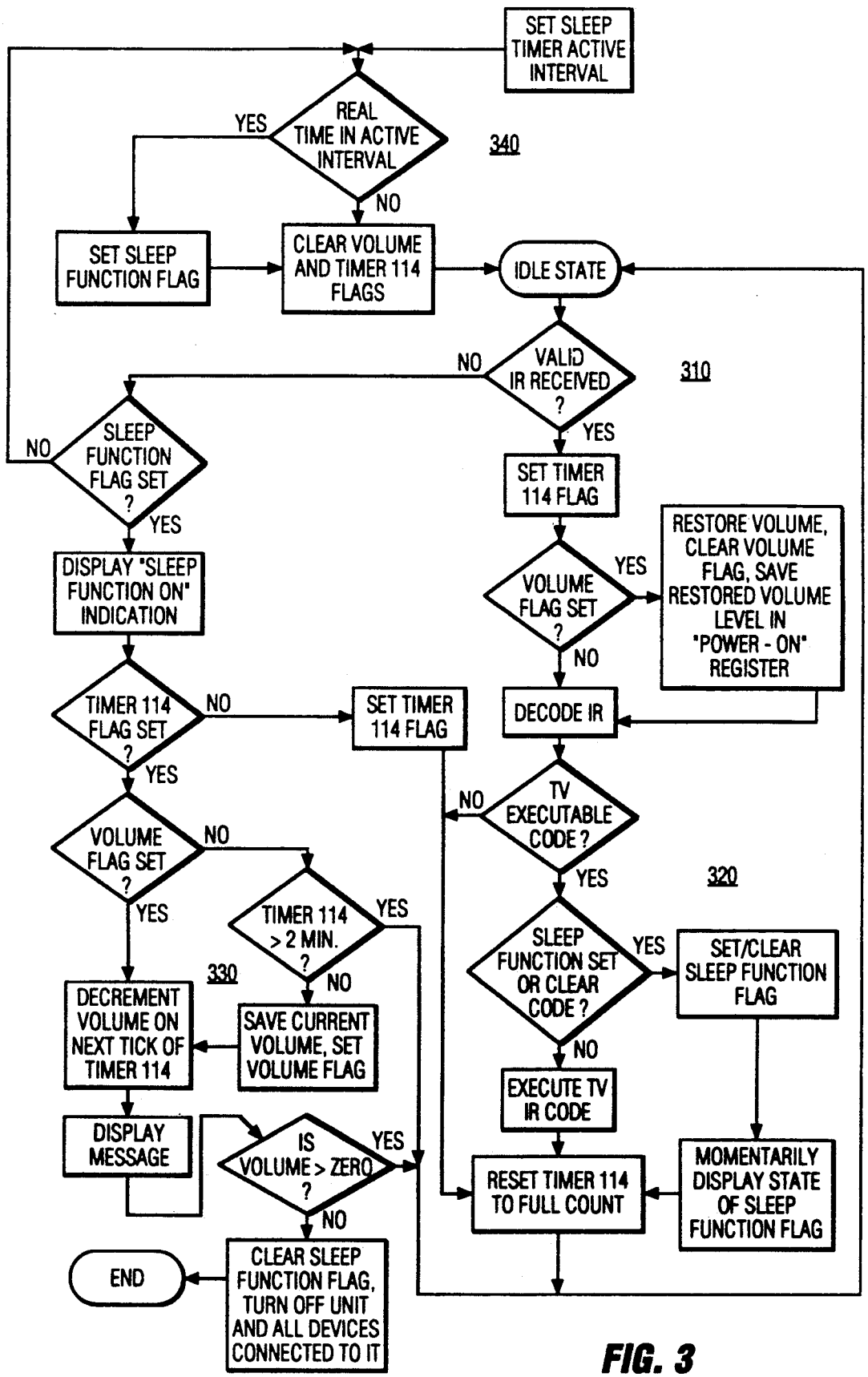
FIG. 3 is a more detailed flow chart of a portion of a program suitable for controlling the microprocessor of FIG. 1.

In contrast to the simplified flowchart of FIG. 2, FIG. 3 is a more detailed flowchart of a program suitable for use with the invention. In view of the fact that the same functions are performed, a detailed discussion of the flowchart of FIG. 3 is not deemed necessary. It should be sufficient for one skilled in the art to note that the section of FIG. 3 generally designated 310 serves substantially the same purpose as blocks 205, 210, 215, and 245 of the flowchart of FIG. 2. Similarly, the section of FIG. 3 generally designated 320 serves substantially the same purpose as blocks 250 and 260 of the flowchart of FIG. 2. And finally, the section of FIG. 330 generally designated 330 serves substantially the same purpose as blocks 225, 230, 235, and 240 of the flowchart of FIG. 2.

Figure 4:
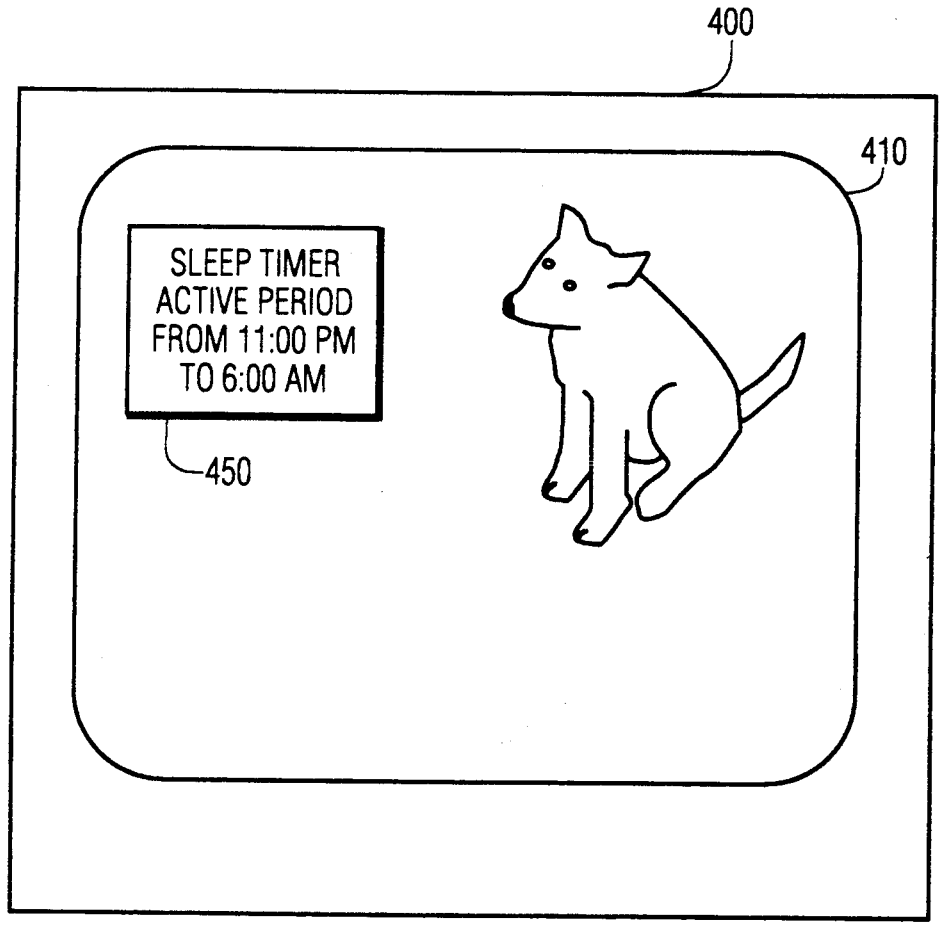
FIGS. 4–6 illustrate a display screens having indicia displayed thereon which are suitable for use with the invention.

The area of FIG. 3 generally designated 340 allows a user to specify a time interval, or "window" within which the sleep function circuitry is enabled. It is envisioned that a television receiver having a sleep function in accordance with the present invention may make use of either dedicated keys on a keyboard, or selections from a menu, for entering instructions as to the sleep function active interval. As shown in FIG. 4, for purposes of programming the sleep function window, a sleep function instruction screen is displayed along with the video on a display screen in response to the aforementioned pressing of a dedicated key for recalling such a display, or in response to the selection from a menu of that particular function. In the either case, FIG. 4 shows a display in which the user has already entered data which will cause the sleep timer to be active between the hours of 11:00 pm and 6:00 am which are the most likely hours in which a viewer might fall asleep with the television receiver still turned on.

It is herein recognized that the viewer may become interested in the television program and remain awake. As noted above, it is preferable to slowly ramp-down the volume during the final two minutes before turning off the receiver. This is the preferred operation for three reasons. First, by slowly ramping down the volume the sleeping user is not "shocked awake" by the sudden absence of the audio portion of the television program. Second, the steadily decreasing volume serves as a warning signal to a user who is still awake that the sleep function circuitry has begun the process of turning the television off. Third, using decreasing volume as a warning signal naturally causes the user to pick up the remote control transmitter to correct for the decrease volume. Thus, the very act of correcting the volume is the act (i.e., starting an IR transmission) which is required to reset the sleep function.

Figure 5:
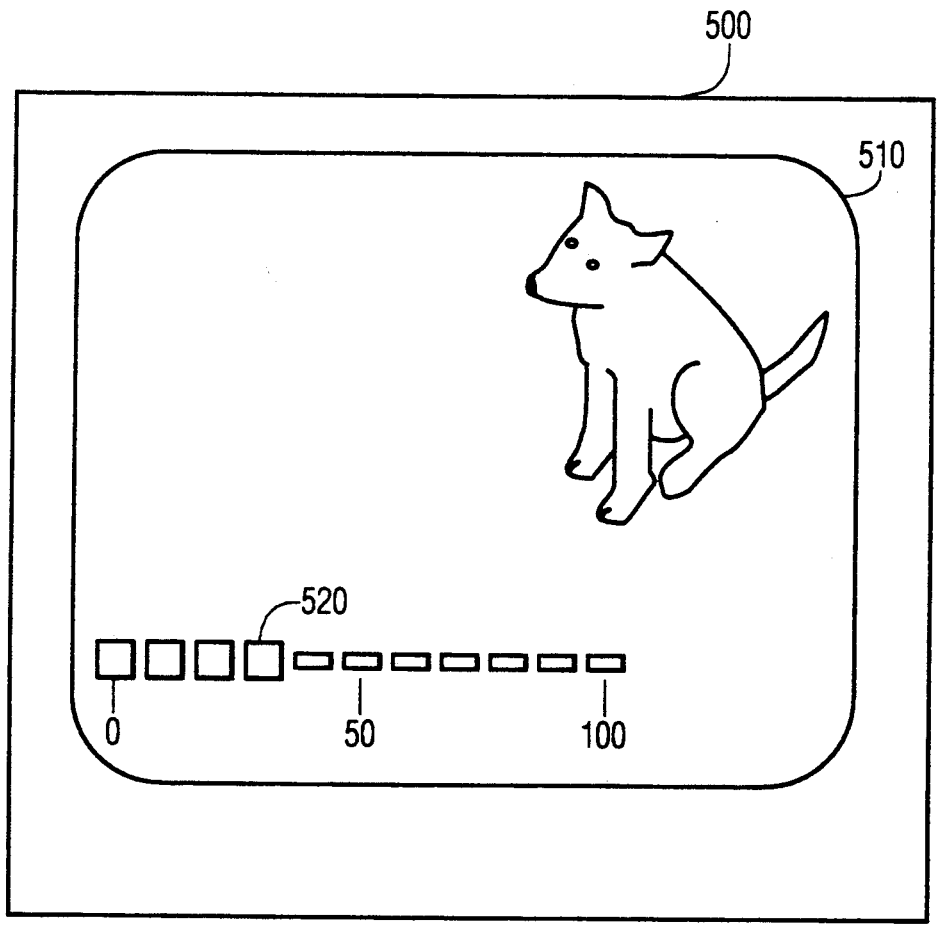
Figure 6:
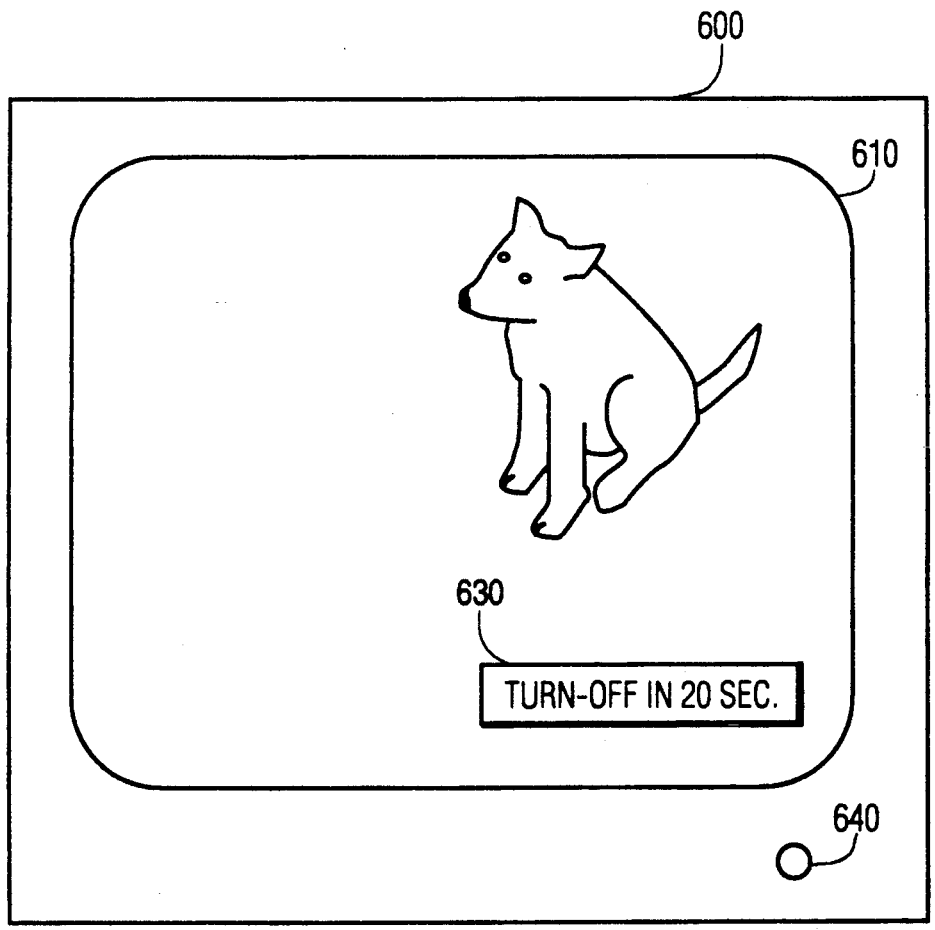

However, in an embodiment that does not ramp down the volume, it would be undesirable for the sleep function circuitry to automatically turn off the receiver without providing some other form of warning beforehand. FIGS. 5 and 6 illustrate two warning indications suitable for display on a display screen (in addition to, or in place of a decrease of volume), during, for example, the final two minutes of the sleep time interval. In FIG. 5, a bar graph 520 is displayed along with the video on a screen 510 of a television receiver 500. The bar may be indicative of time remaining until turn off. Alternatively, when used in an embodiment which decreases the volume, the visual display may indicate current audio volume level. In either case, this display would serve to warn an awake viewer that the sleep circuitry was about to automatically turn off the receiver, while, at the same time, not disturbing a user who has already fallen asleep. FIG. 6 illustrates a screen display in which the bar graph of FIG. 5 has been replaced with a "time remaining" display 630. FIG. 6 also shows an LED, liquid crystal display (LCD), or lamp 640 which, when illuminated, for example during the final two minutes of the sleep time interval, could serve as a visual sleep-function automatic turn-off warning in television receivers without on-screen display capability.

While the invention has been described in relation to an embodiment set in the environment of a television receiver (i.e., television set or VCR), it is envisioned that it could also be employed in a radio receiver, compact disc (CD) player or the like.

What is claimed is:

1. Apparatus for automatically removing operating power from a consumer electronics unit, comprising:
   a source of standby power;
   a source of operating power having a control input;
   remote control receiver means for receiving, and detecting the presence of, a remote control signal modulated with data, said modulated remote control signal being one of a first type and a second type;
   control means coupled to said source of standby power, to said remote control receiver means for decoding said data from said first type of said modulated remote control signal, said control means being unable to decode said second type of modulated remote control signal, and to said control input of said source of operating power for controlling said source of operating power in response to said data;
   timer means, coupled to said control means, for timing a predetermined time interval and generating a signal indicative of the expiration of said predetermined time interval, said timer means being capable of being reset by said control means;
   signal processing circuitry, coupled to said control means and to said source of operating power, for processing signals of said consumer electronics unit; and
   means for providing an indication to a user that automatic removal of operating power from said consumer electronics unit is enabled; wherein
   said control means, during said predetermined time interval, causes said indicating means to produce said indication that said automatic removal of operating power is enabled and, in response to said detection of said presence of said modulated remote control signal of either of said first and second types from any source by said remote control receiver means during said predetermined time interval, resets said timer means to begin timing said predetermined time interval again, said timer means, at the expiration of said predetermined time interval, applies said signal indicative of the expiration of said predetermined time interval to said control means, and said control means, in response thereto, causes said source of operating power to cease supplying power to said signal processing means.

2. The apparatus of claim 1 wherein said signal processing means includes video processing means and said means for providing an indication to a user that automatic removal of operating power from said consumer electronics unit is enabled is an on-screen display means for generating a visual display when said timer means is timing said predetermined time interval.

3. The apparatus of claim 1 wherein said means for providing an indication to a user that automatic removal of operating power from said consumer electronics unit is enabled is an illumination means for indicating when said timer means is timing said predetermined time interval.

4. The apparatus of claim 1 further including controlled power receptacle means for selectively applying AC power to external devices connected thereto.

5. The apparatus of claim 1 wherein said predetermined time interval is fixed.

6. The apparatus of claim 1 wherein data relating to said predetermined time interval is entered by a user.

7. The apparatus of claim 1 further including real time clock means for keeping time of day, and providing signals indicative of time of day to said control means; said timer means being enabled by said control means to time said predetermined time interval during only a predetermined portion of a day.

8. Apparatus for automatically removing operating power from a consumer electronics unit, comprising:
   a source of standby power;
   a source of operating power having a control input;
   data input means for receiving data entered by a user;
   control means coupled to said source of standby power, to said data input means for decoding said data, and to said control input of said source of operating power for controlling said source of operating power in response to said data;
   said control means including timer means, coupled to said control means, for timing a predetermined time interval and generating a signal indicative of the expiration of a said predetermined time interval, said timer means being capable of being reset under control of said control means;
   means for providing an indication to a user that automatic removal of operating power from said consumer electronics unit is enabled; and
   signal processing circuitry, coupled to said control means and to said source of operating power, for processing signals of said consumer electronics unit; wherein
   said control means, during said predetermined time interval, causes said indicating means to produce an indication that said automatic removal of operating power is enabled and, in response to the reception of said data during said predetermined time interval, resets said timer means to begin timing said predetermined time interval again irrespective of any information corresponding to said data, said timer means, at the expiration of said predetermined time interval, applies said signal indicative of the expiration of said predetermined time interval to said control means, and said control means, in response thereto, causes said source of operating power to cease supplying power to said signal processing means; and further including real time clock means for keeping time of day, and providing signals indicative of time of day to said control means;

said timer means being enabled by said control means to time said predetermined time interval during only a predetermined portion of a day.

9. Apparatus for use in a television receiver for automatically removing operating power from television signal processing circuitry of said television receiver, comprising:

a source of standby power;

a source of operating power having a control input;

remote control receiver means for receiving an IR remote control signal modulated with data in accordance with any of a plurality of formats, and for demodulating a remote control signal modulated in accordance with a predetermined one of said plurality of formats, said remote control receiver means producing one of said demodulated signal and a signal indicative of the reception of an IR remote control signal modulated in accordance with any format other than said predetermined one of formats;

control means coupled to said source of standby power, to said remote control receiver means for receiving said one of said demodulated signal and said indicative signal therefrom, and to said control input of said source of operating power for controlling said source of operating power in response to the reception of said one of said demodulated signal and said indicative signal;

timer means, coupled to said control means, for timing a predetermined time interval and generating a signal indicative of the expiration of said predetermined time interval, said timer means being capable of being reset under control of said control means;

said signal processing circuitry, being coupled to said control means and to said source of operating power, for processing said television signals of said television receiver; and means for providing an indication to a user that automatic removal of operating power from said signal processing circuitry is enabled; wherein said control means, during said predetermined time interval, causes said indicating means to produce said indication that said automatic removal of operating power is enabled and, in response to said one of said demodulated signal and said indicative signal during said predetermined time interval, regardless of any information content of said demodulated signals, resets said timer means to begin timing said predetermined time interval again, said timer means, at the expiration of said predetermined time interval, applies said signal indicative of the expiration of said predetermined time interval to said control means, and said control means, in response thereto, causes said source of operating power to cease supplying power to said signal processing means.

10. The apparatus of claim 9 wherein said means for providing an indication includes audio signal processing means, and said control means causes the volume of said audio signals to be automatically gradually decreased substantially to zero during said predetermined time interval.

11. The apparatus of claim 9 wherein said signal processing circuitry includes video processing means and said means for providing an indication to a user that automatic removal of operating power from said consumer electronics unit is enabled is an on-screen display means for generating a visual display when said timer means is timing said predetermined time interval.

12. The apparatus of claim 9 wherein said means for providing an indication to a user that automatic removal of operating power from said consumer electronics unit is enabled is an illumination means for indicating when said timer means is timing said predetermined time interval.

13. The apparatus of claim 9 further including controlled power receptacle means for selectively applying AC power to external devices connected thereto.

14. The apparatus of claim 9 wherein said predetermined time interval is fixed.

15. The apparatus of claim 9 wherein said predetermined time interval is entered by a user.

16. The apparatus of claim 9 further including real time clock means for keeping time of day, and providing signals indicative of time of day to said control means;

said timer means being enabled by said control means to time said predetermined time interval during only a predetermined portion of a day.

* * * * *